United States Patent [19]

Gallagher, Jr.

[11] Patent Number: 5,094,698

[45] Date of Patent: Mar. 10, 1992

[54] METHOD OF MAKING HIGH STRENGTH STEEL PARTS

[75] Inventor: Hugh M. Gallagher, Jr., Cincinnati, Ohio

[73] Assignee: Consolidated Metal Products, Inc., Cincinnati, Ohio

[21] Appl. No.: 602,675

[22] Filed: Oct. 24, 1990

[51] Int. Cl.⁵ ............................................. C21D 8/00
[52] U.S. Cl. .................................. 148/12 F; 72/364; 72/700
[58] Field of Search ............... 72/364, 700; 148/320, 148/12 F

[56] References Cited

U.S. PATENT DOCUMENTS

| | | | |
|---|---|---|---|
| 1,862,281 | 6/1932 | Schaefer | 72/377 |
| 2,767,836 | 10/1956 | Nachtman | 72/41 |
| 2,767,837 | 10/1956 | Nachtman | 72/41 |
| 2,880,855 | 4/1959 | Nachtman | 72/41 |
| 2,953,794 | 9/1960 | Klooz | 72/364 |
| 3,066,408 | 12/1962 | Fader | 72/341 |
| 3,076,361 | 2/1963 | Epstein et al. | 148/12.1 |
| 3,557,587 | 1/1971 | Cardillo | 72/41 |
| 3,573,999 | 4/1971 | Gokyu | 72/364 |
| 3,720,087 | 3/1973 | Gottschlich | 72/364 |
| 3,877,281 | 4/1975 | Shimizu et al. | 72/364 |
| 3,908,431 | 9/1975 | Jones et al. | 72/364 |
| 4,289,548 | 9/1981 | Bucher et al. | 148/320 |
| 4,312,210 | 1/1982 | Nishizawa et al. | 72/267 |
| 4,317,355 | 3/1982 | Hatsuno et al. | 72/364 |
| 4,608,851 | 9/1986 | Khare | 72/364 |
| 4,805,437 | 2/1989 | Heil, Jr. et al. | 72/364 |

OTHER PUBLICATIONS

Nehl, E., "Warm extrusion of free-cutting steels-properties of extruded parts", Draht 35(12), 604–08, 1984.

Primary Examiner—Deborah Yee
Attorney, Agent, or Firm—Wood, Herron & Evans

[57] ABSTRACT

High strength steel parts and method of making are disclosed by providing a blank of high-strength steel material having a tensile strength of at least about 120,000 psi and a yield strength of at least about 90,000 psi and warm forming the blank to provide the part of desired geometric configuration while substantially maintaining the strength properties of the blank.

8 Claims, No Drawings

METHOD OF MAKING HIGH STRENGTH STEEL PARTS

FIELD OF THE INVENTION

The present invention relates to a method of making high-strength steel parts and the parts produced thereby, and more particularly it relates to a method in which a blank of high-strength steel is warm formed into a desired geometric configuration while maintaining the high-strength properties of the steel blank.

BACKGROUND OF THE INVENTION

Steel parts have heretofore been formed using cold forging or hot forging techniques which are well known in the art. In hot forging parts from steel, the material is initially heated to about 2000° F. and higher. At these hot forging temperatures, substantial scale and decarburization of the steel occurs. Since the scale and decarburized surfaces must be removed to obtain the finished part, known hot forging techniques result in the waste of a certain amount of material; furthermore, such techniques are costly due to increased processing steps required to remove the scale and the higher energy consumption because of the high temperatures. On the other hand, there are drawbacks to cold forming parts as well. Since the part is formed at or about room temperature, the reshaping or forming steps require substantially higher forces. This frequently necessitates a series of cold forming steps in which the material is formed into the desired part gradually. This increases die wear and noise associated with such processes. Furthermore, if the material is worked to a substantial degree over a series of forming stages, the strength of the part is increased and the part must therefore be annealed between successive cold forming operations to relieve internal stress, which adds to the time and cost of such processes.

To avoid the above drawbacks, warm forging may be utilized to form parts from materials at an intermediate temperature which is high enough to reduce the strength of the material and thereby facilitate forming, and yet is below the hot forging temperature at which scaling and decarburization occurs. One such warm forming method is disclosed in U.S. Pat. No. 3,557,587. Certain other patents disclose processes which include rolling and extruding steps carried out at "warm" temperatures so as to avoid the drawbacks of decarburization and scaling and/or to impart or improve desired metallurgical and mechanical properties to the steel. See U.S. Pat. Nos. 2,767,836; 2,767,837; 2,880,855; 3,076,361; 3,573,999, and "Warm Working of Steel", Gokyu, et al, translation of the Japanese Institute of Metal, 1968, Volume 9, Supplement, Pages 177–181.

Additionally, there are other known methods for bending or forging steel bars, rods or billets to form a desired product which methods include a warmforming or warm forging step. See U.S. Pat. Nos. 2,953,794; 3,720,087; 3,877,821; 4,312,210; 4,317,355; 4,608,851 and 4,805,437. No representation is made that any of the above cited references fairly represent the prior art or that such references are the most material references.

There has heretofore been lacking a method of making a high-strength steel part from a blank of steel possessing desired high-strength properties, which method includes a warm forming step whereby the blank is formed into a desired part and whereby the mechanical properties of the part remain substantially the same as those originally possessed by the blank, and in which the part is produced without additional strengthening processing steps to impart mechanical strength properties to the steel part.

SUMMARY OF THE INVENTION

The present invention is directed to a method of making high-strength steel parts from blanks of high-strength steel material having a tensile strength of at least about 120,000 psi and a yield strength of at least about 90,000 psi.

In one of its aspects, the present invention provides a method of making high-strength steel parts from blanks of high-strength steel material by warm forming the blank to provide a part having a desired geometric configuration, whereby the mechanical properties of tensile strength and yield strength of the part are substantially the same as the blank.

The present invention also provides a method of making high-strength steel parts including warm forming a blank of high-strength steel material whereby the mechanical properties of tensile strength and yield strength of the part are substantially the same as the blank and wherein the part, with the desired mechanical properties of tensile strength and yield strength, is produced without further strengthening processing steps. High-strength steel parts are produced in accordance with the method of this invention.

The principles of this invention, its objectives and advantages will be further understood with reference to the following detailed description.

DETAILED DESCRIPTION OF THE INVENTION

The method of the present invention is useful for producing a wide variety of high-strength steel parts including various types of bolts (U-bolts, eye-bolts, J-bolts, hex-head bolts, square-head bolts, etc.), axles, cam shafts, screws, sway bars and other parts susceptible to forming by the warm forging or forming process disclosed herein.

In a preferred embodiment, the method of the present invention for making a high-strength steel part includes providing a blank of high-strength steel material having a tensile strength of at least about 120,000 psi, and preferably at least about 150,000 psi, and a yield strength of at least about 90,000 psi, and preferably at least about 130,000 psi. In one form, the high-strength steel material utilized as the blank has been hot reduced and cold drawn to provide the blank having the mechanical properties of tensile strength and yield strength stated above.

The high-strength steel material may be exemplified by the following composition, by weight percent:

| | |
|---|---|
| carbon | about 0.30 to about 0.65% |
| manganese | about 0.30 to about 2.5% |
| vanadium | up to about 0.35% |
| iron | balance |

In a more preferred form, the high-strength steel material has the following composition, by weight percent:

| | |
|---|---|
| carbon | about 0.50 to about 0.55% |
| manganese | about 1.20 to about 1.65% |
| vanadium | about 0.03 to about 0.15% |

| | |
|---|---|
| iron | balance |

The blank, having a composition and mechanical properties of tensile strength and yield strength as given above, is thereafter warm formed at a temperature of about 300° to about 1200° F. to provide a part having a desired geometric configuration, whereby the mechanical properties of tensile strength and yield strength of the part are substantially the same as the blank. The temperature at which the part is formed is related to the chemical composition of the steel material used. The formed part, with the mechanical properties of tensile strength and yield strength given, is produced without any further strengthening processing steps subsequent to the warm forming thereof.

The blank of high-strength steel material having a tensile strength of at least about 120,000 psi and a yield strength of at least about 90,000 psi, which is used as the starting piece in the method of the present invention is produced by any suitable method known in the art. One such method is disclosed in U.S. Pat. No. 3,904,445 to the present inventor, and the specification in its entirety is incorporated herein by reference. The '445 patent discloses a processing sequence to produce a high-strength steel bar stock of the type particularly useful for producing threaded fasteners, including U-bolts. In the described process, the bar stock produced has a fine grained structure between about ASTM No. 5-8. In the disclosed process, a steel, having a chemistry falling within certain disclosed ranges, is subjected to a standard hot reducing operation to within 10%-15% of final gauge. The hot reduced bar stock is then cut or severed into individual lengths for rapid air cooling. Thereafter the individual lengths of hot reduced bar stock are subjected to a cold finishing to final gauge. The final step is a controlled stress relieving step to increase the mechanical strength properties. This stress relieving step comprises heating the lengths of bar stock to between about 500°-850° F. for about 1 hour, but may or may not be necessary. Thus, such bar stock, with and without further stress relieving may be used to form the starting blank material of high-strength steel.

The following example illustrates the practice of the present invention to produce a U-bolt from high-strength steel bar stock produced in accordance with the method disclosed in my U.S. Pat. No. 3,904,445, described above.

EXAMPLE

High-strength steel bar stock of Grade 8 strength steel, having a diameter of 0.825", is cut to lengths of approximately 36". This stock has a tensile strength of at least about 150,000 psi and a yield strength of at least about 130,000 psi. Both ends of the bar stock segments are threaded using known threading processes to provide 2¼" threaded sections at either end thereof. The bar stock segments are then heated to approximately 850° F. and a medial section of each bar stock segment is flattened using a mechanical forging press applying approximately 1,000 tons of pressure. The flattened section of the bar stock is approximately 7/16" thick and 1¼" wide. Thereafter, the bar stock segments are bent at the location of the flattened section to form the U-bolt product. The flattening step provides elongation to the bar stock segment such that the total length of the finished U-bolt product is somewhat in excess of 36".

The finished U-bolt product has the desired mechanical properties of tensile strength and yield strength originally possessed by the bar stock and therefore requires no further strengthening processing steps.

The scope of the present invention is not intended to be limited by the examples provided herein, but rather is defined by the appended claims.

What is claimed is:

1. A method of making a high-strength steel part comprising the steps of:
   providing a blank of high-strength steel material having a tensile strength of at least about 120,000 psi and a yield strength of at least about 90,000 psi; and
   warm forming the blank to provide a part having a desired geometric configuration, whereby the mechanical properties of tensile strength and yield strength of the part are substantially the same as the blank;
   wherein the high-strength steel material comprises, by weight percent:

| | |
|---|---|
| carbon | about 0.30 to about 0.65% |
| manganese | about 0.30 to about 2.5% |
| vanadium | up to about 0.35% |
| iron | balance | said part with said mechanical properties of tensile strength and yield strength produced without further strengthening processing steps.

2. The method of claim 1 wherein the high-strength steel material has previously been hot reduced and cold drawn to provide the blank having a tensile strength of at least about 120,000 psi and a yield strength of at least about 90,000 psi.

3. The method of claim 1 wherein the blank of high-strength steel material has a tensile strength of at least about 150,000 psi and a yield strength of at least about 130,000 psi.

4. The method of claim 1 wherein the high-strength steel material comprises, by weight percent:

| | |
|---|---|
| carbon | about 0.50 to about 0.55% |
| manganese | about 1.20 to about 1.65% |
| vanadium | about 0.03 to about 0.15% |
| iron | balance. |

5. The method of claim 1 wherein said warm forming is carried out at a temperature between about 300° to about 1200° F.

6. A method of making a high-strength steel product consisting of the steps of:
   providing a blank of high-strength steel material having a tensile strength of at least about 120,000 psi and a yield strength of at least about 90,000 psi;
   wherein the high-strength steel material comprises, by weight percent:

| | |
|---|---|
| carbon | about 0.30 to about 0.65% |
| manganese | about 0.30 to about 2.5% |
| vanadium | up to about 0.35% |
| iron | balance; and | warm forming the blank to provide a part having a desired geometric configuration, whereby the mechanical properties of tensile strength and yield strength of the part are substantially the same as the blank.

7. A method of making a high-strength steel part comprising the steps of:

provi ding a blank of high-strength steel material having a tensile strength of at least about 150,000 psi and a yield strength of at least about 130,000 psi, which material has previously been hot reduced and cold drawn to provide the blank with said strength properties, said high-strength steel material comprising, by weight percent:

| | |
|---|---|
| carbon | about 0.50 to about 0.55% |
| manganese | about 1.20 to about 1.65% |
| vanadium | about 0.03 to about 0.15% |
| iron | balance; and | warm forming the blank at a temperature of about 300° to about 1200° F., to provide a part having a desired geometric configuration, whereby the mechanical properties of tensile strength and yield strength of the part are substantially the same as the blank;

said part with said mechanical properties of tensile strength and yield strength produced without further strengthening processing steps.

8. The method of claim 6 wherein the high-strength steel material comprises, by weight percent:

| | |
|---|---|
| carbon | about 0.50 to about 0.55% |
| manganese | about 1.20 to about 1.65% |
| vanadium | about 0.03 to about 0.15% |
| iron | balance. |

* * * * *